United States Patent [19]

Clark

[11] 4,287,724

[45] Sep. 8, 1981

[54] AIR CHILLER/DRIER

[75] Inventor: Ralph E. Clark, Villanova, Pa.

[73] Assignee: Morehouse Industries, Inc., Fullerton, Calif.

[21] Appl. No.: 104,410

[22] Filed: Dec. 17, 1979

[51] Int. Cl.³ .............................................. F25D 21/00
[52] U.S. Cl. .......................................... 62/272; 62/65; 62/93; 165/163; 165/164; 165/168; 165/184
[58] Field of Search ............................. 62/93, 272, 65; 165/163, 164, 168, 184

[56] References Cited

U.S. PATENT DOCUMENTS

| | | | |
|---|---|---|---|
| 1,810,750 | 6/1931 | Braunstein et al. | 62/93 |
| 2,477,772 | 8/1949 | Simpson | 62/93 |
| 3,258,932 | 7/1966 | Kern | 62/93 |
| 3,705,621 | 12/1972 | Schoonman | 165/176 |
| 3,734,174 | 5/1973 | Bloxham et al. | 165/177 |
| 3,739,842 | 6/1973 | Whalen | 165/164 |
| 3,896,633 | 7/1975 | Moore | 62/93 |

Primary Examiner—Ronald C. Capossela
Attorney, Agent, or Firm—Knobbe, Martens, Olson, Hubbard and Bear

[57] ABSTRACT

A device for cooling air to a temperature below its dew point and for separating condensed liquid from the cooled air to produce dry air is disclosed.

9 Claims, 4 Drawing Figures

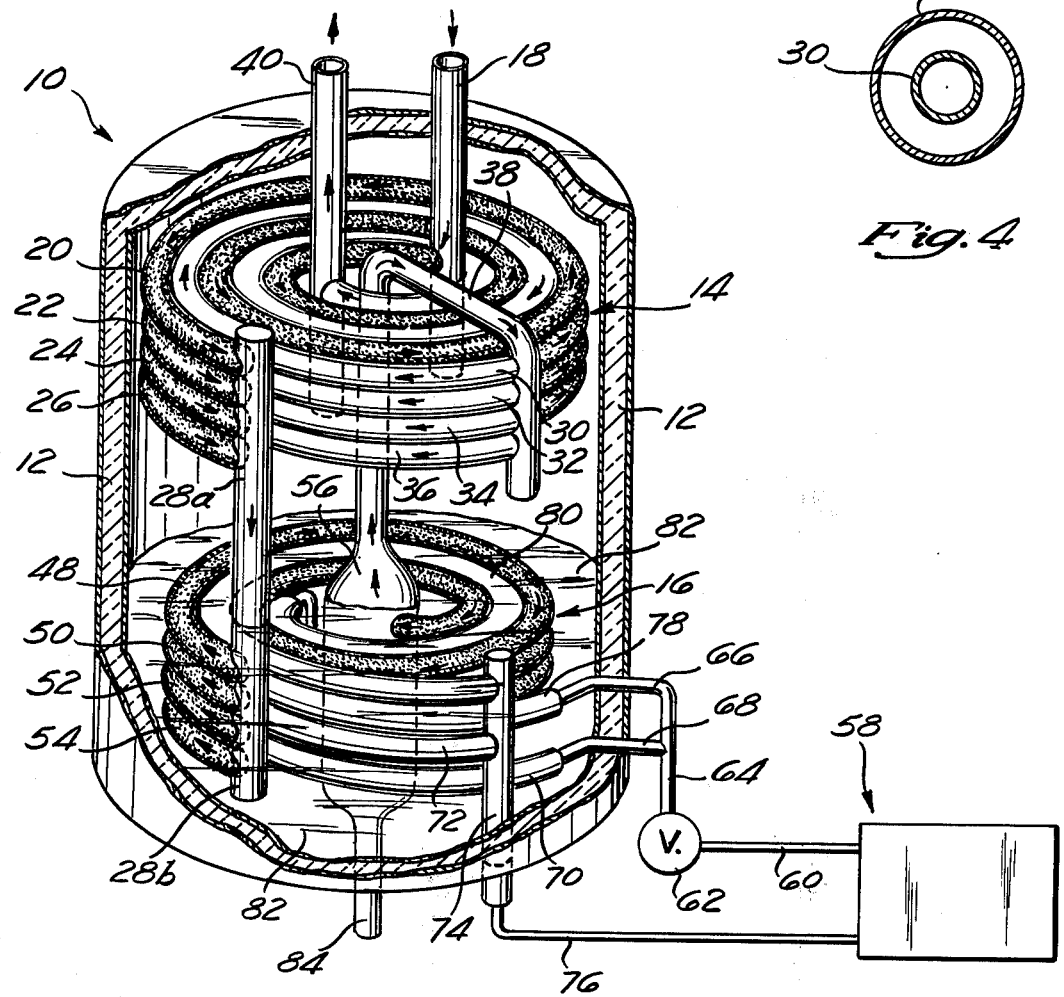
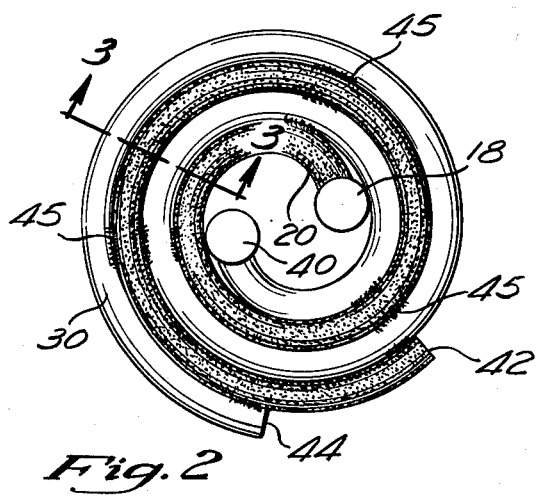
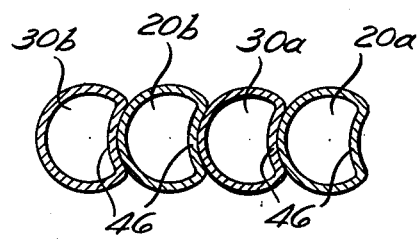

AIR CHILLER/DRIER

BACKGROUND OF THE INVENTION

The invention is generally directed to devices which dry air. Specifically, the invention is directed to devices which cool air to below its dew point temperature and remove the liquid which condenses at these lower temperatures, to produce dry air.

A significant need for such air drying devices is found in industrial facilities which channel compressed air to various locations in the facility. This compressed air is normally then expelled through hoses at individual stations to clean or operate machinery and the like. An important problem with such a system is that the air being compressed contains water. Due to the pressure increase and temperature variations in the system the compressed air may, on some days, be very moist and even have water droplets. This is undesirable or unacceptable in many situations.

To remove this undesirable moisture, air drying devices have, in the past, been incorporated into the compressed air lines between the compressor and the end use areas.

One type of such devices is generally known in the field as "shell and tube devices". Generally, such devices have many central tubes which contain refrigerant. A larger diameter cylinder is located around the central tubes. The air to be chill/dried is then ducted between the outer shell and the inner central tubes. This process is somewhat uneconomical, since the refrigerant is continuously regenerated.

The assignee of the present invention has for several years marketed a refrigerated air dryer which has several advantages over the "shell and tube" systems. Generally, the device has an upper portion which contains a pre-cooling section in which air entering from the compressor is partially cooled before entering the chiller located in the lower portion of the device.

Specifically, in the assignee's prior device, air enters an intake manifold which channels the air into conduit paths. The conduit paths begin in the central area of the device and spiral radially outward in parallel horizontal planes toward the exterior of the device. The effect of this upper portion is that the cooled air partially cools the air entering from the compressor. By this method, the cool air exiting from the separator is partially heated and then ducted to the exterior of the device back into the compression lines of the particular system. The heat is extracted from the incoming air by means of a heat sink material which completely surrounds each of the spiral planes. Without this heat sink material, the cool air is unable to adequately absorb heat from the incoming air.

The partially cooled air is then ducted into a series of parallel horizontal planes, each having a spiral configuration in a chiller section located in the lower portion of the device. The planes are stacked vertically with the partially cooled air traveling a spiral path from the exterior portion of the device radially inward to the interior of the device. Positioned to alternate with each of the air conduits are a series of horizontal planar spiral conduits which direct the flow of a refrigerant such as Freon. The alternating horizontal spiral planes of air and refrigerant conduits are stacked loosely in a vertical configuration. A heat sink material is dispersed throughout the chiller section of the device. The cooled air from the spiral air conduits enters a separator located in the center of the device. In the separator, condensed liquid produced from cooling the air to below its dew point temperature is funneled away leaving the cooled dry air to be ducted upward toward the pre-cooling section which was described above.

The refrigerant in the chiller section and the cooled dry air in the pre-cooling section absorb thermal energy from the heat sink material, as well as the air to be cooled. This utilization of the heat sink material means that the refrigerant does not have to be constantly regenerated. Rather, a thermostat is used to sense the temperature of the heat sink material. Thus, when the heat sink material rises to a certain temperature, the thermostat activates the compressor of the refrigeration system, and begins the cycling of the refrigerant. Conversely, when a certain lower temperature is achieved, the compressor of the refrigeration section is deactivated and the cooling of the air is achieved through the conduction of thermal energy from the air conduits directly to the heat sink material.

Although this air drier system represents a significant improvement over the "shell and tube" systems, it nevertheless possesses several disadvantages. To adequately transfer heat and cold within the system, an extremely efficient heat sink material is utilized. The heat sink material employed is usually a mixture of aluminum particles dispersed in oil. This possesses the disadvantages that the aluminum particles have a strong tendency to settle to the bottom of the device, producing a very heavy aluminum concentration in the lower portion of the device and a very low concentration of aluminum in the upper portion of the device. This results in an imbalance throughout the device in the efficiency of the heat sink material. Secondly, the aluminum and oil heat sink material is extremely difficult to manage and creates significant clean-up problems if leaks occur. The aluminum and oil heat sink material is also quite expensive.

In view of the above problems, a significant need exists for improved air drier devices.

SUMMARY OF THE INVENTION

The air drier of the invention obviates the problems encountered by the prior art devices discussed above. The invention contains a pre-cooler section in the upper portion of a refrigerated air drier and a chiller section in the lower portion of the device. The pre-cooler section in one preferred embodiment comprises at least one pair of conduits formed from a conduit containing incoming air from a compressed source, and a conduit containing cooled dry air exiting from the separator. This pair of conduits is wound in intimate contact in a spiral configuration to form a horizontal plane with sections of the incoming air conduit alternating with sections of the cooled dry air conduit extending radially outward. The cooled dry air conduit is preferably complementarily contoured to provide significant surface area contact with the air conduit. This, together with the tight wrap of the spiral configuration, allows for improved transfer of thermal energy between the conduits which, in turn, makes the use of a heat sink material in the pre-cooling section unnecessary. One or more of these horizontal spiral planes can be employed in the pre-cooling section.

In another preferred embodiment, the conduits in the pre-cooled section are positioned in a tube-in-tube arrangement. Thus, cooled air conduits are positioned within conduits ducting incoming warmer air.

With either embodiment, the partially cooled air from the pre-cooling section is then channeled into the chiller. In the chiller section, at least one pair of conduits formed from a conduit ducting the partially cooled incoming air and a conduit ducting a refrigerant is wound in a horizontal spiral configuration with sections of the partially cooled air conduit alternating with sections of the refrigerant conduit extending radially outward. As described above in the pre-cooler section, the conduits can be complementarily contoured to increase the surface area contact between the air conduit and refrigerant conduit. A plurality of parallel horizontal spiral sections are preferably used. The chiller section also contains a heat sink material which is a mixture of water and a material which reduces the water's freezing point, such as an alcohol. Such a medium is much less expensive than aluminum and oil and is much easier to work with.

The cooled air exits from the cooling section into a centrally located separator which drains off the condensed liquid. The cooled dry air then rises from the separator into the pre-cooling section which was described above.

Thus, due to the surface contact of the air and refrigerator conduits, a heat sink material having less thermal conductivity can be tolerated, which, in turn, allows for a much less expensive, and more manageable, heat sink medium. Due to increased efficiency, the size of the refrigerator compressor can be reduced for a given amount of air to be cooled. The system is also modular in that additional horizontal spiral conduit sections can be added in either the chiller or pre-cooling sections to increase the cooling capacity of the device. Also, the positioning of the conduits achieved in the spiral configuration or tube-in-tube configuration allows for the elimination of the heat sink material in the pre-cooling section of the device.

DESCRIPTION OF THE DRAWINGS

These and other advantages of the disclosed invention will be clarified through the following discussion and reference to the accompanying drawings which are the following:

FIG. 1 is a perspective, schematic view in partial cross-section of the air chiller/drier invention;

FIG. 2 is a top view of the pre-cooling section of the device of FIG. 1;

FIG. 3 is a cross-section of the conduits of the pre-cooling section taken along line 3—3 of FIG. 2; and FIG. 4 is a cross-section of the conduits of the pre-cooling section in a preferred embodiment.

DETAILED DESCRIPTION OF THE PREFERRED EMBODIMENTS

Referring to FIG. 1, an air chiller/drier 10 includes a generally cylindrical container having insulated walls 12 throughout. The chiller/drier device 10 has an upper pre-cooling section shown generally as 14, and a lower chiller section shown generally as 16.

In the pre-cooling section 14, air to be cooled coming from a source such as a compressor (not shown) enters an intake manifold 18. The vertically oriented intake manifold 18 channels the incoming air into four parallel air conduits 20, 22, 24, and 26. Each of the air conduits 20, 22, 24, and 26 lies in a horizontal plane and is formed into a spiral configuration. Thus, air exiting from the intake manifold 18 generally located in the central area of the device will follow one of four parallel spiraling paths to a pre-cooler out-take manifold 28a located near the exterior of the device 10. Interposed with each of the spiraling air conduits 20, 22, 24, and 26 are spiraling cooled dry air conduits 30, 32, 34, and 36. Cooled dry air exiting from the chiller section 16, which will hereinafter be more fully described, enters a generally U-shaped conduit 38, which channels the cooled dry air into four parallel spiraling paths. The cooled dry air enters the cooled dry air conduits 30, 32, 34, and 36 from the U-shaped conduit 38, near the exterior of the device 10, and spirals inwardly to enter a dry air exit manifold 40. The cooled dry air conduits 30, 32, 34, and 36 therefore form four horizontal planes of interposed spirals with the air conduits 20, 22, 24, and 26, respectively.

FIG. 2 depicts a top view of one of these horizontal planes of interposed spirals. Intake manifold 18 is shown near the central area of FIG. 2. Air entering the intake manifold 18 is channeled into air conduit 20. Air conduit 20 spirals radially outward to an exit point 42 located toward the exterior of the device 10. Interposed with the spiral formed by air conduit 20 is a spiral formed from cooled dry air conduit 30. Cooled dry air enters conduit 30 at an entry point 44 and spirals radially inward to the dry air exit manifold 40, located in the central area of the device 10. There is thus formed a plane of interposed spirals with sections of the air conduit 20 alternating with sections of the cooled dry air conduit 30, extending radially outward.

Having described one of the horizontal planes having interposed spirals, it will be clear that cooled dry air conduits 32, 34, and 36 form similar planes of interposed spirals with air conduits 22, 24, and 26, respectively. It should also be understood that the number of spiral planes used in the pre-cooler section 14 is a matter of choice depending upon the cooling desired.

The planar interposed spirals provide for intimate surface area contact between the cooled dry air conduits 30, 32, 34, and 36, and the air conduits 20, 22, 24, and 26, respectively. In manufacturing a plane of interposed spirals, a cooled dry air conduit, e.g., 30, and an air conduit, e.g., 20, are wrapped as a pair into a spiral. Since there is a natural tendency for the conduits to straighten into their original configuration, a force directed radially outward from the central area of the spiral plane is created. Applying a mechanical means to hold the conduits in a spiral configuration results in the conduits being urged into intimate surface area contact. For example, the cooled dry air conduits, e.g., 30, may be bonded to the air conduits, e.g., 20. Preferably the cooled dry air conduits 30, 32, 34, and 36 and air conduits 20, 22, 24, and 26 are made from a stainless steel or copper. If made of copper, a cooled dry air conduit, e.g., 30, would be bonded to an air conduit, e.g., 20, by brazing. Conversely, if made of stainless steel, a cooled dry air conduit, e.g., 30, would be bonded to an air conduit, e.g., 20, by welding.

The cooled dry air conduit 30 and air conduit 20 are welded together at suitable locations, such as three radially extending weldment lines 45, as shown in FIG. 2. It should be understood that other means for holding the conduits in their interposed spiral configurations can be employed, such as clamps or bands.

Surface area contact can be increased between the cooled dry air conduit, e.g., 30, and air conduit, e.g., 20, in a horizontal plane by complementarily contouring the conduits which will be better understood with reference to FIG. 3, showing a cross-sectional view of one of the horizontal planar spirals. As shown, air conduit 20 has conduit sections 20a and 20b. Similarly, cooled dry air conduit 30 has conduit sections 30a and 30b. The conduits 20 and 30 are generally circular tubes. Each of the conduit sections 20a, 20b, 30a, and 30b has a concave portion 46 which is complementarily contoured to contact a circular portion of an adjacent conduit section.

One way to complementarily contour adjacent conduit sections is to flatten a portion of a conduit section which will then contact a complementarily flattened section of an adjacent conduit section. This result can be accomplished by first constructing the pre-cooled section as shown in FIG. 1 with circular conduit tubes. The cooled dry air conduits 30, 32, 34, and 36 and air conduits 20, 22, 24, and 26 are then expanded with hydraulic pressures of about 3,500 to 4,000 pounds. This pressured expansion tends to flatten the interengaging portions of the tubes and thereby increases surface area contact between the cooled dry air conduits 30, 32, 34, and 36 and air conduits 20, 22, 24, and 26, respectively.

A cross-section of a plane of conduits, after being expanded, as described, would appear as shown in FIG. 3 except that sections 46 would be flat rather than concave and would complementarily contact flat portions of adjacent conduit sections. In addition, the degree of surface area contact achieved by flattened interengaging portions of the tubes would normally not be as pronounced as shown in FIG. 3.

Another preferred embodiment for the geometry of the conduits in the pre-cooling section 14 is generally shown in FIG. 4. FIG. 4 is a schematic cross-sectional view depicting a tube-in-tube method of arranging the cooled dry air conduits and air conduits. In this approach, a cooled dry air conduit 30 is positioned within a larger diameter inlet air conduit 20. It is advantageous for the cooled dry air conduit to be placed within the air conduit in the pre-cooling section 14, since the thermal energy absorbed by the cooled dry air conduit will be taken from the surrounding air conduit only as opposed to the environment. If the cooled air conduit were located around the air conduit, it would absorb some of the heat from the environment which would be less efficient. This configuration provides significant surface area contact between the cooled dry air conduits and air conduits. This approach would then take the place of the interposed spirals shown in FIG. 1.

The surface area contact between the cooled dry air conduits and air conduits with either the interposed spiral or tube-in-tube geometrical configurations provides exceptional surface area contact, thereby making it unnecessary to include a heat sink material in the pre-cooling section 14.

Returning to the description of the air flow, partially cooled air exiting from the pre-cooler out-take manifold portion 28a travels vertically down conduit 28 to a chiller intake manifold portion 28b. The chiller intake manifold 28b channels the partially cooled air into four parallel horizontally oriented, partially cooled air conduits 48, 50, 52, and 54. Each of the partially cooled air conduits 48, 50, 52, and 54 begins near the exterior of the device 10 and spirals radially inward to a separator 56, thereby forming four parallel horizontal spiral planes.

In the chiller section 16, the partially cooled air is cooled to a temperature below the air's dew point temperature. This causes condensation of the water vapor from the air which is drained off, thereby producing cool dry air. This cooling to below the air's dew point temperature is effected by means of a refrigeration system which will now be described.

Referring to FIG. 1, there is schematically shown a refrigerator compressor-condensor system 58 as is well understood by those of ordinary skill in the art. The compressor compresses a low boiling point liquid or liquified gas, such as ammonia, ethyl chloride, or Freon. The refrigerant used in the preferred embodiment is Freon. The liquid Freon passes from the compressor through a conduit 60 which leads to an expansion valve 62. The Freon travels from the expansion valve 62 to conduit 64 which bifurcates into conduits 66 and 68, which then duct the Freon into the chiller section 16.

In the chiller section 16, the Freon is evaporated at a low pressure and thereby absorbs thermal energy from the surrounding environment as is well understood by those of ordinary skill in the art. The Freon ducted by conduit 68 is directed to refrigerant conduit 70 which is located near the exterior of the device 10. Refrigerant conduit 70 spirals inwardly toward the central area of the device 10, and is located in contact with and in the same horizontal plane as the partially cooled air conduit 54. Thus, refrigerant conduit 70 and partially cooled air conduit 54 form two interposed spirals in a horizontal plane. In the preferred embodiment, the evaporating Freon directed by refrigerant conduit 70 is directed vertically upward at the central area of the device by a suitable conduit, not shown, to the next level which is defined by refrigerant conduit 72. Thus, the refrigerant passes from refrigerant conduit 70 to refrigerant conduit 72 at the central area of the device, and is then carried toward the exterior of the device 10 by refrigerant conduit 72 which spirals outwardly to a refrigerant out-take manifold 74. Refrigerant conduit 72 and partially cooled air conduit 52 form a similar pair of interposed spirals as has been described before. The evaporated refrigerant is then carried by refrigerant out-take manifold 74 by suction via conduit 76, back to the compressor-condensor 58. The refrigeration cycle would then be repeated.

Similarly, conduit 66 carries refrigerant to refrigerant conduit 78 which spirals radially inward and forms an interposed spiral with the partially cooled air conduit 50. A conduit, not shown, then directs the refrigerant upward one level to a level occupied by refrigerant conduit 80 which spirals outwardly to the refrigerant out-take manifold 74. Refrigerant conduit 80 therefore forms an interposed spiral with partially cooled air conduit 48.

In the preferred embodiment, two separate conduit paths for the refrigerant have been described. One path is defined by refrigerant conduit 70 with spirals radially inward to the center of the device, directed vertically upward one level to refrigerant conduit 72 which then spirals outward toward the exterior of the device and directs the evaporating refrigerant back to the compressor-condensor 58. The second conduit path is represented by refrigerant conduit 78 which spirals radially inward to the central area of the device, and is directed upward one level to refrigerant conduit 80 which spirals radially outward and directs the evaporating refrigerant back to the compressor-condensor 58. It should be understood that the number of conduit paths will be dependent upon the size of the device 10 involved. For smaller devices, less conduit paths are necessary. Thus, in a small device, only one conduit path could be used, whereas in the larger devices, multiple number of paths would be employed. The object is to obtain low pressure loss within the refrigerant conduit tubes in the chiller section 16. This versatility in increasing the number of conduit paths in the chiller section 16 represents an important advantage in that the chiller section is modular in concept. Thus, additional conduit paths can be added by simply adding another horizontal plane of interposed spirals formed by a partially cooled air conduit and a refrigerant conduit.

As described, each of the refrigerant conduits 70, 72, 78, and 80 form interposed spirals in a single horizontal plane with partially cooled air conduits 54, 52, 50, and 48, respectively. As described above with respect to the pre-cooled section 14, the interposition of the partially cooled air conduit spirals and refrigerant conduit spirals provides intimate surface area contact between the refrigerant conduits and partially cooled air conduits. Since the conduits are wrapped in a spiral configuration, there is a natural tendency for them to unwind. Thus, if the conduits are held in the spiral configuration by mechanical means such as clamps or bands, the conduits are urged into intimate surface area contact. If desired, a refrigerant conduit, e.g., 70, may be welded or brazed to a partially cooled air conduit, e.g., 54, in a single horizontal plane, depending upon whether the conduits are made from steel or copper.

The surface area contact between a refrigerant conduit and partially cooled air conduit in a horizontal plane can be further increased by complementarily contouring the conduits in a manner as described with respect to the pre-cooling section 14. Thus, a portion of each refrigerant conduit 70, 72, 78, and 80 may be concave to contact with a circular portion of an adjacent partially cooled air conduit 54, 52, 50, or 48, respectively. A cross-section of one of the horizontal spiral planes of a refrigerant conduit, e.g., 70, and a partially cooled air conduit, e.g., 54, would thus appear as shown in FIG. 3.

A preferred way to increase the surface area contact in a horizontal plane of a refrigerant conduit, e.g., 70, and a partially air cooled conduit 54 is to expand the conduit under a hydraulic pressure of 3,500 to 4,000 pounds, as described above with respect to the preceding section 14, which tends to flatten the conduits in their area of interengagement and thereby increases surface area contact.

A heat transfer medium, i.e., a heat sink material 82 is provided exclusively in the chiller section 16. The heat sink material 82, which is normally a liquid, is dispersed throughout the chiller section and is in intimate contact with the refrigerant conduits and partially cooled air conduits. The heat sink material 82 increases the heat transfer between the refrigerant conduits and the partially cooled air conduits. In addition, the heat sink material 82 will be cooled by the evaporation of the refrigerant within the refrigerant conduits 70, 72, 78, and 80. This utilization of the heat sink material 82 means that the refrigerant does not have to be constantly regenerated. Rather, a thermostat, not shown, is used to sense the temperature of the heat sink material. Thus, when the heat sink material 82 rises to a certain temperature, the thermostat activates the compressor-condensor 58 of the refrigeration system and begins the cycling of the refrigerant Freon. Conversely, when a certain lower temperature is achieved, the compressor-condensor 58 of the chiller section 16 is deactivated, and the cooling of the air is achieved through the conduction of thermal energy from the partially cooled air conduits 54, 52, 50, and 48, directly to the heat sink material 82.

The outstanding heat transfer efficiency between the refrigerant conduits and partially cooled air conduits resulting from the intimate surface area contact, allows for the use of a less expensive, more manageable heat sink material than the aluminum and oil medium used in the prior art device. The preferred heat sink material 82 is water mixed with a constituent which will lower the freezing temperature of the water, such as alcohol. In the preferred embodiment, the heat sink material comprises approximately 50% water and 50% glycol. This heat sink material is inexpensive, easy to work with, and yet provides adequate heat transfer properties.

As described, the air in the chiller section 16 is cooled to below its dew point temperature and enters the separator 56 from the partially cooled air conduits 48, 50, 52, and 54. In the separator 56, the liquid produced from the condensation of the cooled air is drained off through a drain trap 84. This leaves dry cool air which rises from the separator 56 into the U-shaped conduit 38 and is then directed into the pre-cooling section 14, as has already been described.

The following is a specific example of the operation of the chiller/drier device 10. Air was ducted to the intake manifold 18 from a suitable compressor at about 100° F. It was cooled within the pre-cooler section 14 and entered the chiller section 16 at about 65° F. The liquid refrigerant was maintained at a temperature of about 25° F. The cooled air entering the separator 56 was cooled to a temperature of about 35° F. This raised the temperature of the refrigerant to about 30° F. when it was returned to the compressor-condensor 58. The cooled dry air entering the pre-cooling section 14 at 35° F. was heated by the air entering intake manifold 18 to a temperature of about 75° F. The cooled dry air at 75° F. was then returned to the compressed air lines of a using system via dry air exit manifold 40.

It is claimed:

1. An air drier comprising:
    a pre-cooler section for partially cooling air from an air source comprising conduits for ducting incoming warm moist air and conduits for ducting outgoing cooled dry air, at least one pair of conduits formed from an outgoing cooled dry air conduit and an incoming warm air conduit being interposed in coaxial spirals so that sections of said cooled dry air conduit alternate in intimate surface area contact with sections of said incoming warm air conduit; and
    a chiller section comprising means for cooling said partially cooled air to a temperature below its dew point to produce chilled air which, when separated from liquid condensed from said chilled air, produces chilled dry air, said means for chilling said partially cooled air including a refrigerant, means for evaporating said refrigerant to absorb heat from the surrounding environment, means for ducting said air to the surrounding environment of said evaporating means to lower the temperature of said air below its dew point, and means for conducting thermal energy between said ducting means and said evaporating means, said thermal conducting means being located exclusively within said chiller section.

2. The device of claim 1 wherein said pair of conduits are generally circular tubes with a portion of each tube being flat to complementarily contact with a flat portion of an interposed tube.

3. The device of claim 1 further comprising means for retaining said pair of conduits in said spirals.

4. The device of claim 3 wherein said pair of conduits are bonded to each other.

5. The device of claim 1 wherein said thermal conducting means comprises a mixture of water and a substance which decreases the freezing point of said water.

6. The device of claim 5 wherein said freezing point depression substance is an alcohol.

7. The device of claim 6 wherein said alcohol is glycol.

8. A device for drying air comprising:
   means for cooling air from an air source to a temperature below the dew point to produce cooled air and to cause moisture in the air to condense to liquid; and
   means for separating said liquid from the air to produce cooled dry air, said air cooling means comprising:
   a refrigerant;
   means for evaporating said refrigerant to absorb heat from its surrounding environment; and
   means for ducting said air to the surrounding environment of said evaporating means to lower the temperature of said air to below its dew point, said evaporating means and said ducting means comprising conduits formed into a plurality of substantially planar spirals arranged horizontally, one above the other, each of said spirals comprising at least one pair of conduits formed from an evaporation conduit and a ducting conduit interposed in coaxial relation so that within each spiral, sections of said evaporation conduit alternate in intimate surface area contact with sections of said ducting conduit.

9. In an air drier having upper and lower cooling sections within an outer housing, said upper section comprising a pre-cooler section having conduits for ducting incoming warm, moist air and conduits for ducting outgoing cooled dry air, the temperature of said incoming warm, moist air being lowered by said outgoing cooled dry air to produce partially cooled air which flows into said lower section, said lower section comprising a chiller section having means for cooling said partially cooled air to a temperature below its dew point to produce chilled air which, when separated from liquid condensed from said chilled air, produces said cooled dry air which flows into said pre-cooler section, said means for chilling said partially cooled air including conduits for ducting said partially cooled air and conduits for ducting coolant and means for conducting thermal energy between said partially cooled air conduits and said coolant conduits, said thermal conducting means being located within said housing surrounding said chiller section, the improvement comprising:
   said pre-cooler section conduits being a plurality of spirals arranged horizontally, one above the other, each of said spirals comprising at least one pair of conduits formed from an outgoing cooled dry air conduit and an incoming warm air conduit interposed in coaxial relation so that, within each spiral, sections of said outgoing cooled dry air conduit alternate in intimate surface area contact with sections of said incoming warm air conduit; and
   said chiller section conduits being a plurality of spirals arranged horizontally, one above the other, each of said spirals comprising at least one pair of conduits formed from a partially cooled air conduit and a coolant conduit interposed in coaxial relation so that, within each spiral, sections of said partially cooled air conduit alternate in intimate surface area contact with sections of said coolant conduit.

* * * * *